US012226930B2

(12) United States Patent
Gouwy et al.

(10) Patent No.: US 12,226,930 B2
(45) Date of Patent: Feb. 18, 2025

(54) 3D CONCRETE PRINTING WITH DUCTILE CORDS

(71) Applicant: NV Bekaert SA, Zwevegem (BE)

(72) Inventors: Matthias Gouwy, Sint-Jans-Molenbeek (BE); Anne Hoekstra, Gerkesklooster (NL)

(73) Assignee: NV BEKAERT SA, Zwevegem (BE)

( * ) Notice: Subject to any disclaimer, the term of this patent is extended or adjusted under 35 U.S.C. 154(b) by 295 days.

(21) Appl. No.: 17/795,717

(22) PCT Filed: Feb. 16, 2021

(86) PCT No.: PCT/EP2021/053754
§ 371 (c)(1),
(2) Date: Jul. 27, 2022

(87) PCT Pub. No.: WO2021/175580
PCT Pub. Date: Sep. 10, 2021

(65) Prior Publication Data
US 2023/0150168 A1  May 18, 2023

(30) Foreign Application Priority Data
Mar. 4, 2020 (EP) ...................... 20160827

(51) Int. Cl.
B28B 1/00 (2006.01)
B28B 23/02 (2006.01)
B33Y 10/00 (2015.01)
B33Y 80/00 (2015.01)
C23C 2/26 (2006.01)

(52) U.S. Cl.
CPC .............. *B28B 1/001* (2013.01); *B28B 23/02* (2013.01); *B33Y 10/00* (2014.12); *B33Y 80/00* (2014.12); *C23C 2/26* (2013.01)

(58) Field of Classification Search
None
See application file for complete search history.

(56) References Cited

U.S. PATENT DOCUMENTS

2017/0129153 A1  5/2017  Koivuharju
2020/0269463 A1* 8/2020  Mayer ....................... E04C 5/07

FOREIGN PATENT DOCUMENTS

WO  2019/092178  5/2019

OTHER PUBLICATIONS

Metal Supermarkets—What Is Spring Steel__Metal Supermarkets—Jun. 25, 2024 (Year: 2024).*
Tashiro—high tensile strength steel cord—Nippon Tech Report—2003 (Year: 2003).*

(Continued)

*Primary Examiner* — John Vincent Lawler
(74) *Attorney, Agent, or Firm* — Wenderoth, Lind & Ponack, L.L.P.

(57) ABSTRACT

A concrete construction (100) made by 3D concrete printing that contains: two or more layers (102, 106) of cementitious material extruded one above the other, and at least one elongated steel element (104) reinforcing at least one of the layers (102, 106). The elongated steel element (104) has an elastic and plastic elongation at break that exceeds 4%. The high elongation of the elongated steel element gives an increased ductility to the concrete structure (100).

16 Claims, 1 Drawing Sheet

(56) References Cited

OTHER PUBLICATIONS

Figure 1:
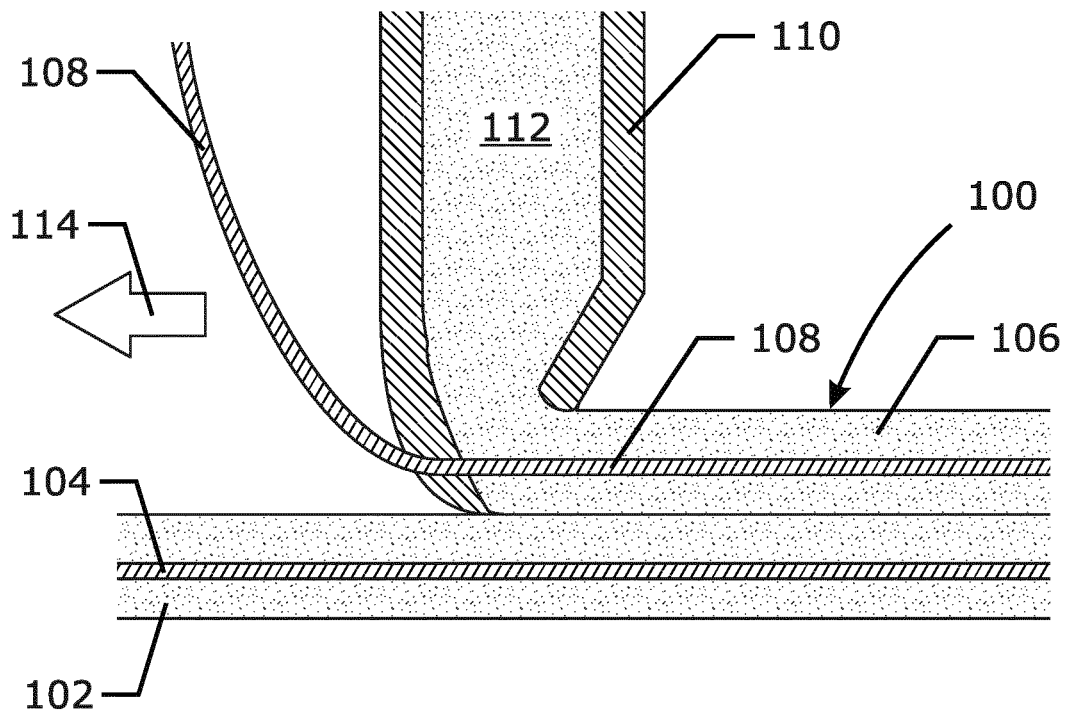

Pajak—concrete reinforced w-steel fibers—Constr. Build. Mat.—some fiber props.—2013 (Year: 2013).*
Bos—Ductility of 3D printed concrete reinforced with short straight steel fibers—Virt. Phys. Proto.—2019 (Year: 2019).*
Bekaert—DRAMIX OL6.16 datasheet—2024 (Year: 2024).*
Salet, T.A.M et al., "Design of a 3D printed concrete bridge by testing", Virtual and Physical Prototyping, Jul. 3, 2018, vol. 13, No. 3, pp. 222-236, XP002798781.
Dezaire, S. "Study on bond capacity of 3D printed concrete with cable reinforcement", Dec. 31, 2018, XP002798782.
International Search Report and Written Opinion of the International Searching Authority issued Apr. 9, 2021, in international (PCT) Application No. PCT/EP2021/053754.

* cited by examiner

3D CONCRETE PRINTING WITH DUCTILE CORDS

TECHNICAL FIELD

The invention relates to a concrete construction that has been made by 3D concrete printing.

BACKGROUND ART

Additive manufacturing of concrete or cementitious materials, herein referred to as '3D concrete printing', has been expanding rapidly over the past years. According to the technique of 3D concrete printing, a pump feeds a cementitious slurry via a hose to a printing nozzle that extrudes the slurry layer by layer. A gantry robot guides and moves the whole, i.e. the hose and the printing nozzle.

Structures of a cementitious matrix in general, and concrete structures in particular, are known to be brittle and to have a poor resistance to tensile or bending stresses. Adding reinforcement to these structures has given these structures more ductility.

The brittle nature is also a problem for structures made by 3D concrete printing.

Traditional reinforcement such as a rebar can be inserted in the printed layers of concrete while the concrete is still uncured. This solution, however, has serious drawbacks. It is labour intensive, error-prone and the adhesion between the rebar and the concrete will be inadequate. In addition, this solution is against the final goal of 3D concrete printing, namely to minimize manual work.

Reinforcement fibres may be added to the cementitious slurry. But experience has shown that a mix of cementitious slurry and concrete is difficult to feed through the hose and printing nozzle.

Another way of solving the problem of reinforcement, is to install a reinforcement lattice or net in advance and to extrude the cementitious slurry around it. Here again, the advance installation of the reinforcement demands labour that one wishes to avoid. Moreover, the presence of the reinforcement complicates the extrusion and the working of the printing head.

The Technical University of Eindhoven in cooperation with Bekaert has come up with an elegant solution that allows depositing simultaneously both the concrete and the reinforcement. A reinforcement entraining device having a spool with a flexible steel cord was added to the printer head. This entraining device travels together with the gantry robot, unwinds the flexible steel cord from the spool and introduces this flexible steel cord inside the deposited concrete layer. In this way simultaneous deposition of both concrete and reinforcement was obtained.

While the used steel cords have lot of advantages such as lightweight, high tensile strength and flexibility, their reinforcement effect was not adequate to provide the required ductility and impact resistance. Hence, 3D printed concrete structures have not been frequently used for load bearing situations.

DISCLOSURE OF INVENTION

It is a general object of the invention to mitigate the drawbacks of the prior art.

It is a more particular object of the invention provide for a reinforcement for 3D concrete printed constructions that have improved ductility.

It is a further object of the invention to provide for 3D concrete printed constructions that are more resistant to impact.

According to the invention, there is provided a concrete construction made by 3D concrete printing. The construction comprises two or more layers of cementitious material extruded one above the other. The construction further comprises at least one elongated steel element reinforcing at least one of the two or more layers, and preferably all of these layers.

The elongated steel element has a carbon content ranging from 0.60% to 1.20%. The elongated steel element has been patented followed by cold working, e.g. by rolling or drawing, until a tensile strength exceeding 2500 MPa, e.g. exceeding 2750 MPa.

The elongated steel element can be a steel wire or a steel cord.

In case of a steel cord, the steel cord has steel filaments or steel strands having steel filaments.

In case of a single steel wire, the wire diameter D ranges from 0.20 mm to 2.0 mm, e.g. from 0.35 mm to 1.50 mm.

In case of a steel cord, the steel filaments may have a filament diameter d ranging from 0.03 mm to 0.65 mm, e.g. from 0.10 mm to 0.40 mm.

In case of a multi-strand steel cord, the diameter d' of the steel strand may range from 0.25 mm to 0.75 mm, e.g. from 0.30 mm to 0.75 mm.

The elongated steel element has an elastic and plastic elongation at break that exceeds 4%, preferably exceeds 4.5%, e.g. 5% or 6% or more. As will be explained hereinafter, the so-called structural elongation of the elongated steel element is not included in this value of elongation.

The terms 'cementitious material' refer to concrete, mortar, cement, . . . .

Common steel cords comprising high-carbon patented and drawn steel filaments have an elastic and plastic elongation at break of maximum 2%. Steel cords used in the present invention have an elastic and plastic elongation at break of more than double this value.

Steel cords have an undulated radially external surface due to their twisted nature. The protruding parts form possible anchorage points in the cementitious matrix when the structure is subjected to tensile loads or bending loads. The steel cord part between the two anchorage points bridges an originated crack. The more this steel cord part can elongate the more ductile the concrete structure. So the steel cords used in the present invention elongate much more and provide much more ductility to the 3D printed structure. The thus reinforced structure shall have more impact resistance and may have better chances to function as load bearing structure.

The elongated steel element used in the present invention is preferably in a stress-relieved state.

In general, all types of steel wires or steel cord that are flexible enough to travel with and through the printer head are appropriate. The steel cord may be a single strand steel cord or a multi-strand steel cord.

The elongated steel elements may be provided with a corrosion resistant coating. The corrosion resistant coating may be a metallic coating such as zinc, a zinc alloy or brass. The corrosion resistant coating may be also a polymeric coating.

In case of a zinc or zinc alloy coating or in the absence of any coating, it is preferable to coat the elongated steel elements with benzimidazole, e.g. by spraying or dipping.

According to a particular aspect of the present invention, there is also provided a process of manufacturing a concrete construction by way of 3D printing as described above. The elongated steel element is fed simultaneously together with the cementitious material through a same printer head or nozzle.

BRIEF DESCRIPTION OF FIGURES IN THE DRAWINGS

FIG. 1 schematically shows the way of making a construction made by 3D concrete printing.

Figure 2:
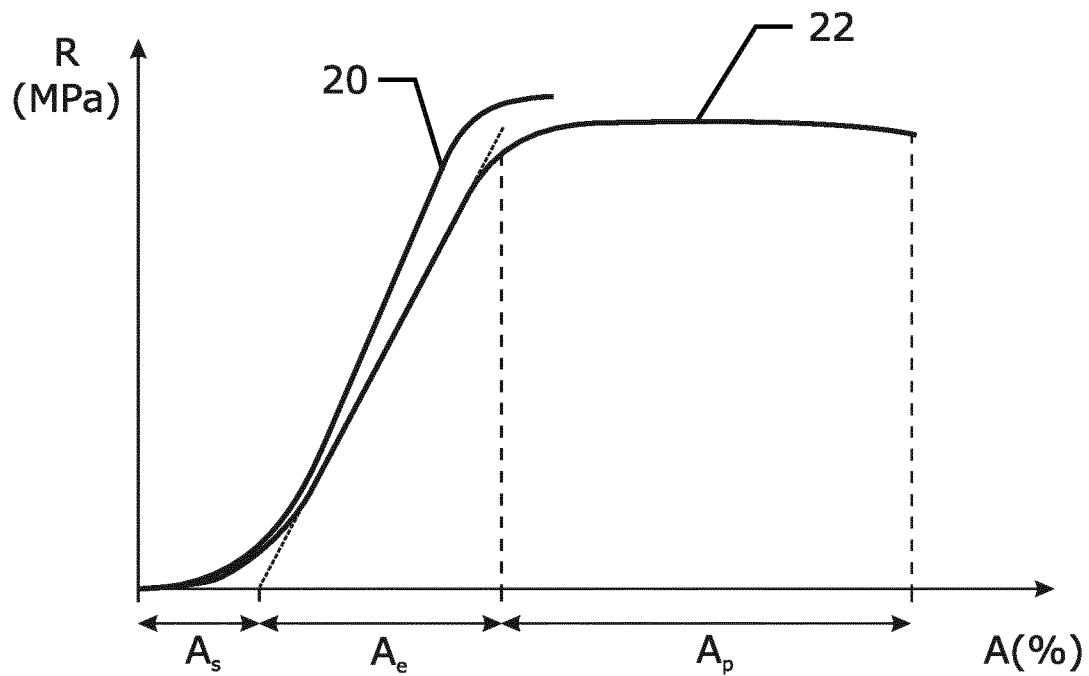

FIG. 2 shows load elongation curves of two types of steel cord.

MODE(S) FOR CARRYING OUT THE INVENTION

FIG. 1 illustrates how a construction 100 with reinforcement is made by 3D concrete printing. The construction 100 has a first layer 102 that is reinforced by a steel cord 104. The construction 100 also has a second layer 106 that is reinforced by a steel cord 108, that may be the same steel cord as the steel cord 104 of the first layer. The second layer 106 is in the process of being extruded above the first layer 102. This extrusion is done by means of a printer head or nozzle 110 that is feeding the concrete slurry 112 and the steel cord 108. The printer head 110 is moving in the direction of the arrow 114.

As the printer head 110 feeds both the concrete slurry 112 and the steel cord 108, the steel cord is following the same path as the concrete layer 106. As the path may be curved and may comprise bends, the steel cord 108 must be flexible enough. This means that the steel filaments have a filament diameter d ranging from 0.03 mm to 0.65 mm, e.g. from 0.10 mm to 0.40 mm. In case of a multi-strand steel cord, the diameter d' of the steel strand may range from 0.25 mm to 0.75 mm, e.g. from 0.30 mm to 0.75 mm.

FIG. 2 shows a load-elongation curve 20 of a common available steel cord and a load-elongation curve 22 of a steel cord to be used in the present invention. The abscissa is the elongation A in percentage and the ordinate is the tensile strength R expressed in MPa. This load-elongation curve is obtained in a tensile test carried out according to norms ISO 6892 and DIN 51210.

The elongation curves 20 and 22 may or may not have a first relatively large elongation at small loads. This elongation is called the structural elongation $A_s$ and is a consequence of the twisted nature of the steel cords. By exercising a small load, the steel filaments or strands inside the steel cord shift somewhat and contact one another more firmly until the steel cord starts to behave as a whole. This structural elongation $A_s$ may be small or large, or even be absent, dependent upon the type of steel cord construction.

The following phase of elongation is the elastic elongation according to Hooke's law. The steel cord behaves as a whole and elongates linearly according to the applied load over an elastic elongation $A_e$.

The final phase of elongation is the plastic elongation. After the elastic elongation $A_e$, the steel filaments start to flow plastically until final fracture of the steel cord.

The degree of plastic elongation $A_p$ is the basic difference between common steel cords and steel cords to be used for the present invention. For steel cords to be used for the present invention, this degree of plastic elongation is much larger. The sum of $A_e$ and $A_p$ is more than 4%, i.e. more than 4.5%, e.g. more than 5%, more than 6%.

Steel cords to be used in the present invention can be made as follows.

Starting Steel Composition

Starting material is a steel rod with steel composition along following lines:

A plain carbon composition is along following lines (all percentages being percentages by weight):
  a carbon content (% C) ranging from 0.60% to 1.20%, e.g. 0.80% to 1.1%;
  a manganese content (% Mn) ranging from 0.10% to 1.0%, e.g. from 0.20% to 0.80%;
  a silicon content (% Si) ranging from 0.10% to 1.50%, e.g. from 0.15% to 0.70%;
  a sulphur content (% S) below 0.03%, e.g. below 0.01%;
  a phosphorus content (% P) below 0.03%, e.g. below 0.01%.

Alternatively, following elements may be added to the composition:
  chromium (% Cr): in amounts ranging from 0.10% to 1.0%, e.g. from 0.10 to 0.50%;
  nickel (% Ni): in amounts ranging from 0.05% to 2.0%, e.g. from 0.10% to 0.60%;
  cobalt (% Co): in amounts ranging from 0.05% to 3.0%; e.g. from 0.10% to 0.60%;
  vanadium (% V): in amounts ranging from 0.05% to 1.0%, e.g. from 0.05% to 0.30%;
  molybdenum (% Mo): in amounts ranging from 0.05% to 0.60%, e.g. from 0.10% to 0.30%;
  copper (% Cu): in amounts ranging from 0.10% to 0.40%, e.g. from 0.15% to 0.30%;
  boron (% B): in amounts ranging from 0.001% to 0.010%, e.g. from 0.002% to 0.006%;
  niobium (% Nb): in amounts ranging from 0.001% to 0.50%, e.g. from 0.02% to 0.05%;
  titanium (% Ti): in amounts ranging from 0.001% to 0.50%, e.g. from 0.001% to 0.010%;
  antimony (% Sb): in amounts ranging from 0.0005% to 0.08%, e.g. from 0.0005% to 0.05%;
  calcium (% Ca): in amounts ranging from 0.001% to 0.05%, e.g. from 0.0001% to 0.01%;
  tungsten (% W): e.g. in an amount of about 0.20%;
  zirconium (% Zr): e.g. in an amount ranging from 0.01% to 0.10%;
  aluminium (% Al): preferably in amounts lower than 0.035%, e.g. lower than 0.015%, e.g. lower than 0.005%;
  nitrogen (% N): in amounts less than 0.005%;
  rare earth metals (% REM): in amounts ranging from 0.010% to 0.050%.

After some preceding wire drawing operations and receiving a final patenting treatment, the steel cords may preferably be provided with a metallic coating in order to increase the corrosion resistance.

Type of Metallic Coating

The metallic coating is preferably a zinc coating or a zinc alloy coating.

A zinc alloy coating may be a zinc aluminium coating that has an aluminium content ranging from 2 percent by weight to 12 percent by weight, e.g. ranging from 3% to 11%.

A preferable composition lies around the eutectoid position: Al about 5 percent. The zinc alloy coating may further have a wetting agent such as lanthanum or cerium in an amount less than 0.1 percent of the zinc alloy. The remainder of the coating is zinc and unavoidable impurities.

Another preferable composition contains about 10% aluminium. This increased amount of aluminium provides a better corrosion protection then the eutectoid composition with about 5% of aluminium.

Other elements such as silicon (Si) and magnesium (Mg) may be added to the zinc aluminium coating. With a view to optimizing the corrosion resistance, a particular good alloy comprises 2% to 10% aluminium and 0.2% to 3.0% magnesium, the remainder being zinc.

An example is 5% Al, 0.5% Mg and the rest being Zn.

A zinc or zinc alloy coating is preferably applied to the steel wire by means of a hot dip operation. The average thickness of the metal coating is preferably limited to 4 micrometer, e.g. to 3 micrometer.

The thus coated steel wires are then subjected to a final diameter reduction e.g. by wet wire drawing until the final filament diameter is obtained. The final diameter ranges between 0.10 mm and 0.80 mm, e.g. between 0.15 mm and 0.60 mm, e.g. between 0.20 mm and 0.40 mm.

Thereafter the steel filaments are twisted into a steel cord.

The thus twisted cord is subjected to a stress-relieving treatment, e.g. by passing the cord through a high-frequency or mid-frequency induction coil of a length that is adapted to the speed of the cord; indeed it is observed that a thermal treatment at a specified temperature of about 300° C. and for a certain period of time brings about a reduction of tensile strength of about 10% without any increase in plastic elongation at break; by slightly increasing the temperature, however, to more than 400° C., a further decrease of the tensile strength is observed and at the same time an increase in the plastic elongation at break; in this way the plastic elongation can be increased to more than 6%, while the tensile strength decreases with about 10% to 15%.

With a view of inhibiting hydrogen gas evolution during the hardening of concrete reinforced with zinc coated metal elements, the steel cords may be treated with benzimidazole, e.g. by spraying or by dipping.

REFERENCE NUMBERS

100 construction made by 3D concrete printing
102 first layer
104 steel cord
106 second layer
108 steel cord
110 printer head or nozzle
112 concrete slurry
114 direction of movement

The invention claimed is:

1. A concrete construction made by 3D concrete printing said construction comprising:
   two or more layers of cementitious material extruded one above the other, and
   at least one elongated steel element reinforcing at least one of said two or more layers,
   said elongated steel element having a carbon content ranging from 0.60% to 1.20%,
   said elongated steel element being cold worked to have a tensile strength exceeding 2500 MPa, wherein said elongated steel element has an elongation at break that exceeds 4%, wherein the elongated steel element is a steel cord.

2. The construction according to claim 1, wherein said elongated steel element is in a stress-relieved state.

3. The construction according to claim 1, wherein said elongated steel element is a steel wire.

4. The construction according to claim 1, wherein said elongated steel element is a steel cord.

5. The construction according to claim 4, wherein said steel cord comprises two or more steel strands.

6. The construction according to claim 4, wherein said steel cord is a single strand cord.

7. The construction according to claim 1, wherein said elongated steel element is provided with a corrosion resistant coating.

8. The construction according to claim 7, wherein said corrosion resistant coating is a zinc alloy coating.

9. The construction according to claim 1, wherein said elongated steel element is provided with benzimidazole.

10. A process of manufacturing a concrete construction according to claim 1 by way of 3D printing, wherein said elongated steel element is fed simultaneously together with the cementitious material through a same printer head or nozzle.

11. The process of manufacturing a concrete construction according to claim 10, wherein said elongated steel element is in a stress-relieved state.

12. The process of manufacturing a concrete construction according to claim 10, wherein said elongated steel element is a steel wire or wherein said elongated steel element is a steel cord.

13. The process of manufacturing a concrete construction according to claim 10, wherein said steel cord comprises two or more steel strands or wherein said steel cord is a single strand cord.

14. The process of manufacturing a concrete construction according to claim 10, wherein said elongated steel element is provided with a corrosion resistant coating.

15. The process of manufacturing a concrete construction according to claim 14, wherein said corrosion resistant coating is a zinc alloy coating.

16. The process of manufacturing a concrete construction according to claim 10, wherein said elongated steel element is provided with benzimidazole.

* * * * *